United States Patent [19]

Rehmer et al.

[11] Patent Number: 5,298,554
[45] Date of Patent: Mar. 29, 1994

[54] POLYMERS OF OLEFINICALLY UNSATURATED MONOMERS AND SOLUTIONS OF THESE POLYMERS

[75] Inventors: Gerd Rehmer, Beindersheim; Juergen Barwich, Neustadt; Gerhard Auchter, Bad Duerkheim, all of Fed. Rep. of Germany

[73] Assignee: BASF Aktiengesellschaft, Ludwigshafen, Fed. Rep. of Germany

[21] Appl. No.: 721,836

[22] Filed: Jun. 26, 1991

[30] Foreign Application Priority Data

Jun. 29, 1990 [DE] Fed. Rep. of Germany ....... 4020767

[51] Int. Cl.$^5$ .......................... C08F 2/06; C08F 20/02; C08F 20/56; C08F 20/68
[52] U.S. Cl. ..................................... 524/725; 524/751; 524/765; 524/770; 524/773; 526/88
[58] Field of Search ............... 526/317.1, 88; 524/725, 524/751, 765, 770, 773

[56] References Cited

U.S. PATENT DOCUMENTS

| | | | |
|---|---|---|---|
| 2,326,326 | 8/1943 | Breedis | 526/88 |
| 2,999,084 | 9/1961 | Arnold et al. | 526/88 |
| 3,330,818 | 7/1967 | Derby | 526/88 |
| 3,438,952 | 4/1969 | Christensen | 526/88 |
| 3,737,288 | 6/1973 | Hochman | 526/88 |
| 4,303,494 | 12/1981 | Whitehurst et al. | 526/88 |
| 4,442,273 | 4/1984 | Neiditch et al. | 526/88 |
| 4,769,410 | 9/1988 | Blum et al. | 525/383 |
| 4,774,303 | 9/1988 | Denzinger et al. | 526/317.1 |
| 4,803,252 | 2/1989 | Kida et al. | 526/317.1 |
| 4,820,742 | 4/1989 | Alexander et al. | 526/88 |
| 4,937,298 | 6/1990 | Miura et al. | 526/317.1 |
| 5,010,150 | 4/1991 | Hennig et al. | 526/88 |
| 5,064,897 | 11/1991 | Tazi et al. | 524/765 |

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

Abstract of the Disclosure: Polymers of olefinically unsaturated monomers and solutions of these polymers are obtainable by a process in which the olefinically unsaturated monomers are polymerized in the presence of a free radical initiator in solution under polymerization conditions which are otherwise predetermined, in such a way that the solvent and/or a liquid part of one or more reactants of the polymerization batch are initially taken and heated to the polymerization temperature, and some or the total amount of the monomers to be polymerized is fed continuously to the agitated initially taken part of the polymerization batch via one or more feeds, with maintenance or initiation of the polymerization, in such a way that the outlet orifice of the one or more feeds is located below the surface of the initially taken liquid part of the polymerization batch.

7 Claims, No Drawings

POLYMERS OF OLEFINICALLY UNSATURATED MONOMERS AND SOLUTIONS OF THESE POLYMERS

The present invention relates to polymers of olefinically unsaturated monomers and solutions of these polymers, which are obtainable by a process in which the olefinically unsaturated monomers are polymerized in the presence of a free radical initiator in solution under polymerization conditions which are otherwise predetermined, in such a way that the solvent and/or a liquid part of one or more reactants of the polymerization batch are initially taken and heated to the polymerization temperature, and some or the total amount of the monomers to be polymerized is fed continuously to the agitated initially taken part of the polymerization batch via one or more feeds, with maintenance or initiation of the polymerization, in such a way that the outlet orifice of the one or more feeds is located below the surface of the initially taken liquid part of the polymerization batch.

Polymers of olefinically unsaturated monomers and solutions of these polymers, which are obtainable by a process in which the olefinically unsaturated monomers are polymerized in the presence of a free radical initiator in solution in such a way that a liquid part of the polymerization batch is initially taken and some or the total amount of the monomers to be polymerized is fed continuously to the agitated initially taken part of the polymerization batch via one or more feeds, are known (eg. Example 1 of prior application P 3917881.1) and are used, for example, as a basis for contact adhesives, the outlet orifice of the one or more feeds being located in a conventional manner above the surface of the initially taken liquid part of the polymerization batch. The disadvantage of the polymers and solutions of polymers thus obtainable is that the constituents of the free radical initiators, whose amount determines the mean molecular weight of the polymer under otherwise predetermined polymerization conditions, the mean molecular weight of the polymer decreasing with increasing amount of initiator used, remain unchanged or chemically transformed in free form or chemically or physically bound in the polymer or in the solution of the polymer. Although the amounts are generally only small, the situation is undesirable, unless as a result the performance characteristics of the polymers or polymer solutions are adversely affected or the polymers or the solutions of polymers do not meet the purity requirements.

It is an object of the present invention to provide polymers and solutions of polymers, which are obtainable from unsaturated monomers, with a predetermined mean molecular weight and under otherwise predetermined polymerization conditions, by free radical solution polymerization using reduced amounts of free radical polymerization initiators.

We have found that this object is achieved by the polymers, defined at the outset, of olefinically unsaturated monomers and solutions of these polymers.

The initially taken liquid part of the polymerization batch may comprise, for example, only solvent or solvent and monomers or solvent, monomers and polymerization initiators. As a rule, it is agitated by stirring, conventional anchor stirrers, bar-type stirrers, paddle stirrers, finger-type stirrers, grid stirrers, gyratory stirrers, crossbeam stirrers, scoop stirrers, propeller stirrers or impeller stirrers being used for this purpose.

Monomers not initially taken and polymerization initiators not initially taken are fed to the initially taken mixture, advantageously via separate feeds. They may be fed both as such and in solution, feed in solution being preferred. The monomers not initially taken can be fed to the initially taken mixture via one feed in the form of a mixture, or partly or completely separate from one another, if necessary at different times, via different feeds. The outlet orifices of all monomer feeds are preferably below the surface of the initially taken liquid part of the polymerization batch. Remarkably, an arrangement of the outlet orifice of the initiator feed below the surface of the initially taken liquid mixture results in an additional reduction of the amount of free radical polymerization initiators required under otherwise predetermined polymerization conditions for a predetermined mean molecular weight. This applies in particular when the initiators used are peroxides. Particularly advantageously, all feeds are introduced in such a way that their outlet orifices are located at the bottom of the vessel in which the solution polymerization takes place. As a rule, this is a polymerization kettle which has a volume of from 10 l to 20 m$^3$ and is equipped with a heating apparatus, and a reflux condenser and for working under an inert gas atmosphere or at superatmospheric or reduced pressure. The feeds can be cooled or heated. To avoid blockage of the monomer and initiator feeds, the feeds are advantageously flushed with solvent or inert gas, such as nitrogen, after the end of the monomer and initiator feed, until polymerization is complete. Otherwise, the solution polymerization is carried out in a conventional manner, ie. batchwise or continuously, as a rule at from 20° to 150° C., usually at from 0. 1 to 100 bar and up to monoicier conversions of more than 80, preferably more than 90, % by weight. The amount of solvent is advantageously from 1 to 200% by weight, based on the total amount of the monomers to be polymerized, and the total amount of polymerization initiators used, based on the same total amount, is usually from 0.1 to 10% by weight. As a rule, the solvent is inert and advantageously has a boiling point of from 50° to 150° C. For example, hydrocarbons, such as benzene, toluene, o-, m- and p-xylenes and gasolines, are suitable. Alcohols, such as methanol, ethanol, propanol, butanol or isobutanol, ketones, such as acetone, methyl ethyl ketone or methyl isobutyl ketone, nitriles, such as acetonitrile or benzonitrile, and tetrahydrofuran, ethyl acetate or mixtures of the stated solvents are also suitable. Examples of suitable polymerization initiators are azo compounds, such as 2,2'-azobisisobutyronitrile, 2,2'-azobis-(methyl isobutyrate), 2,2'-azobis-(2,4-dimethylvaleronitrile), 2,2'-azobis-(4-methoxy-2,4-dimethylvaleronitrile), 2,2'-azobis-(N,N'-dimethyleneisobutyramidine) dihydrochloride, 2,2 1 -azobis- (2-amidino-propane) dihydrochloride, 4,4'-azobis-(4-cyanovaleric acid), 2,2'-azobis-(isobutyramide) dehydrate and 2,2'-azobis-(2-methyl-N-[1,1-bis-(hydroxymethyl)-2-hydroxy-ethyl]-propionamide). Peroxides, for example acyl peroxides, such as benzoyl peroxide, dilauryl peroxide, didecanoyl peroxide or isononanoyl peroxide, alkyl peresters, such as tert-butyl pivalate, tert-butyl per-2-ethylhexanoate, tert-butyl permaleate, tert-butyl perisononanoate or tert-butyl perbenzoate, dialkyl peroxides, such as dicumyl peroxide, tert-butyl cumyl peroxide or di-tert-butyl peroxide, peroxydicarbonates, such as dimyristyl peroxydicarbonate, dicetyl peroxydicarbonate or bis-(4-tert-butylcyclohexyl) peroxydicarbonate, and polymerization initiators, such as 3,4-dimethyl-3,4-diphenylhexane and 2,3-dimethyl-2,3-diphenylbutane and hydrogen peroxide combined with reducing agents are also suitable. The stated initiators can be used alone or in combination. If their total amount is not initially taken, they may be fed in continuously or batchwise.

Suitable olefinically unsaturated monomers include esters of 3 to 24 carbon atoms of monoethylenically unsaturated carboxylic acids, in particular esters of acrylic and methacrylic acid. Methyl acrylate, ethyl acrylate, n-butyl acrylate, n-butyl methacrylate, isobutyl acrylate, isobutyl methacrylate, isoamyl acrylate, isoamyl methacrylate, 2-ethylhexyl acrylate, 2-ethylhexyl methacrylate, isooctyl acrylate, isooctyl methacrylate, n-propyl acrylate, isopropyl acrylate, methyl methacrylate, n-decyl acrylate, n-decyl methacrylate, n-dodecyl acrylate and n-dodecyl methacrylate are particularly important. $\alpha,\beta$-Monoethylenically unsaturated mono- or dicarboxylic acids of 3 to 6 carbon atoms, such as acrylic acid, methacrylic acid, itaconic acid, fumaric acid and maleic acid, and the anhydrides of monoolefinically unsaturated dicarboxylic acids, such as maleic anhydride and itaconic anhydride, are also suitable. Other useful olefinically unsaturated monomers are amides, such as acrylamide, methacrylamide, tetrahydrofurfurylacrylamide, tetrahydrofurfurylmethacrylamide, diacetoneacrylamide, hydroxyalkyl acrylates and methacrylates, such as 2-hydroxyethyl acrylate, 2-hydroxyethyl methacrylate, 4-hydroxybutyl acrylate and 4-hydroxybutyl methacrylate, and monomers such as 2-ketobutyl acrylate, 2-ketobutyl methacrylate, N-vinylformamide, N-vinylpyrrolidone, 2-methylene-1,3-dioxepan, 2-methylene-1,3-dioxolane, N-methyl-2-methyleneoxazolidine and 2-methylene-1,3-thiolene,- monomers such as acrolein, methacrolein, acetoacetoxyethyl acrylate, ethylene, propylene, isobutylene, butadiene, isoprene, vinyl methyl ether, vinyl isobutyl ether, vinylpyridine, $\beta$-aminoethyl vinyl ether, aminopentyl vinyl ether, tert-butylaminoethyl methacrylate, vinylaromatics, such as styrene or methylstyrenes, monomers such as vinylcaprolactam, tetrahydrofurfur-2-yl acrylate and tetrahydrofurfur-2-yl methacrylate, and vinyl esters of alkanecarboxylic acids of 1 to 18 carbon atoms may also be used. Monoethylenically unsaturated acetophenone or benzophenone derivatives, as described in, for example, prior publication P 4016056.4, are also particularly important as olefinically unsaturated monomers. The monomers form or carbon tetrachloride. The number average molecular weight of the polymers obtainable according to the invention is, as a rule, from $5.10^2$ to $5.10^4$. It is noteworthy that the solutions, obtainable according to the invention, of polymers of olefinically unsaturated monomers have a reduced content of undesirable gel particles compared with products of conventional free radical solution polymerization processes. Consequently, the novel solutions of polymers of olefinically unsaturated monomers can be used, without additional removal of the resulting gel particles by filtration, to form films which have a smooth appearance.

Polymers and solutions of polymers, which are obtainable in the novel manner from olefinically unsaturated monomers composed of A) from 20 to 100, in particular from 20 to 99.95, % by weight of at least one acrylate and/or methacrylate of an aliphatic alcohol of 1 to 18 carbon atoms, B) from 0 to 15, in particular from 0.05 to 15, % by weight of at least one monoethylenically unsaturated acetophenone and/or benzophenone derivative which has no phenyl group possessing a free hydroxyl group in the ortho-position to the carbonyl group of the phenone parent structure, C) from 0 to 10% by weight of at least one monoethylenically unsaturated monobasic and/or dibasic acid of 3 to 12 carbon atoms and/or anhydrides thereof and D) from 0 to 80, in particular from 0 to 60, % by weight of other olefinically unsaturated monomers, and preferably have a K value from 10 to 120 at 250° C. in tetrahydrofuran (THF) are particularly advantageous. The K value is a relative viscosity number which is determined similarly to DIN 53,726. It includes the flow rate of a 1% strength by weight solution of the polymer in THF and characterizes the mean molecular weight of the polymer. The smaller the K value, the smaller is the mean molecular weight.

Polymers and solutions of polymers having the abovementioned monomer composition are particularly suitable as a basis for UV-crosslinkable contact adhesives. Those which contain monomers B) are particularly preferred. Compared with polymers or solutions of polymers which are prepared from monomers having the same composition in a conventional manner by solution polymerization, the novel polymers of the same mean molecular weight, or solutions of said polymers, give adhesive bonds having a higher shear strength and peel strength.

COMPARATIVE EXAMPLE V AND NOVEL

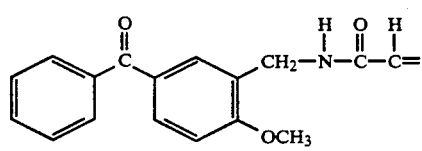

and

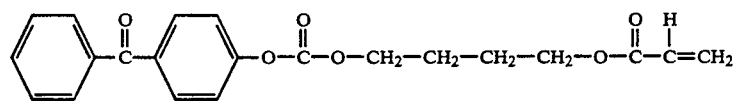

are particularly preferred.

The olefinically unsaturated monomers mentioned by way of example can be subjected to homopolymerization or copolymerization. It is of course also possible to use molecular weight regulators, such as mercaptoethanol, mercaptosuccinic acid, mercaptoglycerol, bromo-

EXAMPLES B a) Preparation

V: A mixture of 15 kg of toluene, 0.1 kg of tert-butyl per-2-ethylhexanoate and 5.0 kg of a monomer mixture of 50 kg of n-butyl acrylate, 29 kg of 2-ethylhexyl acrylate, 18.5 kg of methyl acrylate, 2.5 kg of acrylic acid and 0.65 kg of the monomer

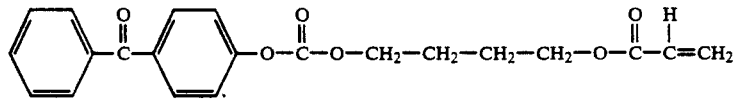

was heated to a polymerization temperature of 800° C. in a polymerization kettle for 10 minutes, after which the remaining monomer mixture was added continuously in the course of 5 hours while maintaining the polymerization temperature and at the same time a solution of 1.9 kg of tert-butyl per-2-ethylhexanoate in 10 kg of toluene was added continuously in the course of 3 hours via a separate feed, both the outlet orifice of the monomer feed and that of the initiator feed being located immediately below the dome of the kettle. Thereafter, polymerization was continued for a further 4 hours at 1170° C., and a solution of a copolymer having a K value of 42.2 (250° C., THF) was thus obtained.

B1: As for V, except that the outlet orifice of the monomer feed was located at the bottom of the polymerization kettle. A solution of a copolymer having a K value of 33.0 (250° C., THF) was thus obtained.

B2: As for B1, except that the subsequently added amount of tert-butyl per-2-ethylhexanoate was only 1.5 kg. A solution of a copolymer having a K value of 35.4 (25° C., THF) was thus obtained.

B3: As for B1, except that the subsequently added amount of tert-butyl per-2- ethylhexanoate was only 1.0 kg. A solution of a copolymer having a K value of 39.3 (25° C., THF) was thus obtained.

B4: As for B1, except that the subsequently added amount of tert-butyl per-2-ethylhexanoate was only 0.5 kg. A solution of a copolymer having a K value of 43.0 (25° C., THF) was thus obtained.

B5: As for B1, except that the subsequently added amount of tert-butyl per-2-ethylhexanoate was only 0.45 kg and the outlet orifice of the initiator feed was likewise located at the bottom of the polymerization kettle. A solution of a copolymer having a K value of 43.1 was thus obtained.

b) Evaluation of the content of gel particles formed (specks)

I. To evaluate the gel particle content, the solutions V and B1 to B5 were applied to a glass sheet to give a film which was 0.02 mm thick when dry. Speck formation was then evaluated visually. The results are shown in Table 1.

TABLE 1

| Solution used | Speck pattern |
| --- | --- |
| V | Very many, relatively large specks |
| B1 | Few specks |
| B2 | Few small specks |
| B3 | Isolated specks |
| B4 | Isolated very small specks |
| B5 | No specks |

II. For further evaluation of the formation of gel particles, the solvent was separated off from the solutions V, B1, B4 and B5 by distillation, and a polyester film was coated with the solvent-free polymers at 1200° C. (from the melt), the total amount applied being 25 g/M$^2$. The coating was examined visually for specks and stripes. The result is shown in Table 2.

TABLE 2

| Polymer from solution | Result |
| --- | --- |
| V | Stripe-containing coating, small and large specks |
| B1 | No stripes, few specks |
| B4 | No stripes, no specks |
| B5 | No stripes, no specks | c) Testing of performance characteristics when used as contact adhesive

For the production of test strips, a polyester film was coated at 120° C. with 25 g/m$^2$ of the solvent-free polymers from the solutions V and B4. The coated polyester film was then passed at a speed of 20 re/min and at a distance of 10 cm under two medium pressure mercury lamps (120 W/cm) arranged one behind the other (11 cm apart). The radiation conditions were varied by switching on only one (A) lamp or both (B) lamps. Strips 2 cm wide and 30 cm long were cut from the resulting self-adhesive films and rolled onto a chromium-plated brass plate over a length of 2.5 cm, using a weight of 2.5 kg, and stored for 24 hours at 23° C. and 65% relative humidity. Thereafter, the unbonded end of the brass plate was fastened between 2 clamping jaws, and the projecting adhesive tape opposite was loaded with a weight of 1 or 2 kg at 23° and 500° C., said tape being freely suspended. The time taken to detach the test strip is a measure of the shear strength. The test values are shown in Table 3. To determine the peel strength, the test strips were peeled off backward from the substrate, parallel to the adhesive layer, at a speed of 300 mm/min, and the force required for this purpose was measured. The results are likewise shown in Table 3.

TABLE 3

| Polymer from solution | Radiation condition | Shear strength [h] | | Peel strength [N/2 cm] |
| --- | --- | --- | --- | --- |
| | | 2 kg, 23° C. | 1 kg, 50° C. | |
| V | A | 11 | 22 | 6.8 |
| B4 | A | >24 | >24 | 8.8 |
| V | B | — | — | 7.3 |
| B4 | B | — | — | 9.4 |

We claim:

1. A process for preparing a polymer of olefinically unsaturated monomers or a solution of the polymer consisting essentially of:

separately taking at least a portion of solvent; or at least a portion of solvent and at least a portion of at least one olefinically unsaturated monomer selected from the group consisting of unsaturated esters of 3 to 24 carbon atoms of monoolefinically unsaturated carboxylic acids, α,β-monoolefinically unsaturated C$_{3-6}$ mono- or dicarboxylic acids, acrylamide, methacrylamide, tetrahydrofururylacrylamide, tetrahydrofurfurylmethacrylamide, diacetoneacrylamide, hydroxyalkyl(meth)acrylates, 2-ketobutyl(meth)acrylamide, N-vinylformamide, N-vinylpyrrolidone, 2-methylene-1,3-dioxepan, 2-methylene-1,3-dioxolane, N-methyl-2-methyleneoxazolidine, 2-methylene-1,3-thiolene, (meth)acrolein, acetoacetoxyethyl acrylate, ethylene, propylene, isobutylene, butadiene, isoprene, vinyl methyl ether, vinyl isobutyl ether, vinylpyridine, $\beta$-aminoethyl vinyl ether, aminopentyl vinyl ether, tert-butylaminoethyl methacrylate, a vinylaromatic vinylcaprolactam, tetrahydrofurfur-2-yl(meth)acrylate, vinyl esters of $C_{1-18}$ alkanecarboxylic acids and monoethylenically unsaturated acetophenone or benzophenone derivatives to be solution polymerized; and optionally at least a portion of the polymerization initiator employed in the polymerization reaction, and placing the taken liquid material in a polymerization vessel;

heating the liquid components of the solution polymerization medium in the vessel to a predetermined polymerization temperature; and continuously feeding any remaining solvent, a portion or all of the monomer and any radical initiator via one or more feedlines to said polymerization vessel in such a way that the orifice outlets of the feedlines are below the surface of agitated liquid polymerization medium which is agitated by an anchor stirrer, bar-stirrer, paddle stirrer, finger stirrer, grid stirrer, gyratory stirrer, crossbeam stirrer, scoop stirrer, propeller stirrer or impeller stirrer in the vessel and polymerizing the at least one monomer under said predetermined conditions in said polymerization medium.

2. The process of claim 1, wherein the initiators to be added to the polymerization medium in the polymerization vessel are introduced through outlet orifice(s) of one or more initiator feedlines located below the surface of the polymerization medium.

3. The process of claim 1, wherein the polymerization reaction is conducted at a temperature of from 20° to 150° C. at a pressure ranging from 0.1 to 100 bar.

4. The process of claim 1, wherein the amount of solvent employed ranges from 1 to 200% by weight based on the total amount of monomer polymerized.

5. The process of claim 1, wherein the amount of initiator employed ranges from 0.1 to 10% by weight based on the weight of monomer.

6. The process of claim 1, wherein said solvent is an alcohol, ketone, nitrile, tetrahydrofuran, ethyl acetate or mixtures thereof.

7. The process of claim 1, wherein said initiator is an azo or peroxide initiator.

* * * * *